United States Patent
Amkreutz

(12) 
(10) Patent No.: US 6,565,467 B2
(45) Date of Patent: May 20, 2003

(54) BELT DE-INSTALLATION TOOL

(75) Inventor: Frank Amkreutz, Aachen (DE)

(73) Assignee: The Gates Corporation, Denver, CO (US)

( * ) Notice: Subject to any disclaimer, the term of this patent is extended or adjusted under 35 U.S.C. 154(b) by 0 days.

(21) Appl. No.: 09/770,839

(22) Filed: Jan. 26, 2001

(65) Prior Publication Data

US 2002/0103048 A1 Aug. 1, 2002

(51) Int. Cl.[7] ............................................... F16H 7/24
(52) U.S. Cl. ...................................................... 474/130
(58) Field of Search ............................... 474/130, 131, 474/132, 128, 129, 101; 29/235, 267, 221.5

(56) References Cited

U.S. PATENT DOCUMENTS

| | | | | |
|---|---|---|---|---|
| 680,063 A | * | 8/1901 | Montgomery et al. | 474/130 |
| 1,755,876 A | * | 4/1930 | Homstead et al. | 474/130 |
| 2,195,359 A | * | 3/1940 | Coe et al. | 474/130 |
| 2,333,395 A | * | 11/1943 | Smith | 474/130 |
| 2,924,109 A | * | 2/1960 | Carriveau | 474/130 |
| 4,109,544 A | | 8/1978 | Clark | |
| 4,111,063 A | | 9/1978 | Journey | |
| 4,193,310 A | | 3/1980 | Boyer et al. | |
| 4,325,703 A | | 4/1982 | Phillips | 474/130 |

FOREIGN PATENT DOCUMENTS

| | | | |
|---|---|---|---|
| EP | 1089016 | * | 4/2001 |
| JP | 09242834 A | * | 9/1997 |

* cited by examiner

*Primary Examiner*—Marcus Charles
(74) *Attorney, Agent, or Firm*—J. A. Thurnau, Esq.; C. H. Castleman, Esq.; S. G. Austin, Esq.

(57) ABSTRACT

A belt de-installation tool having a monolithic curvilinear body. The body comprises a pulley engaging surface for engaging a perimeter of a pulley. A sloped arcuate belt engaging surface extends from the pulley engaging surface at a predetermined angle. A curved surface also extends from each end of the tool at a predetermined angle to the belt engaging surface. The tool is placed on a pulley between belt spans. As the pulley is turned the belt rides up on a curved surface of the tool, holding the tool in contact with the pulley. As it rotates, the belt comes into engagement with and gradually tracks across the sloped arcuate belt engaging surface, moving laterally to a pulley plane until it is fully disengaged from the pulley groove by action of the sloped arcuate belt engaging surface.

8 Claims, 2 Drawing Sheets

BELT DE-INSTALLATION TOOL

FIELD OF THE INVENTION

The invention relates to power transmission belt de-installation tools and more particularly to a belt de-installation tool having a monolithic body and curvilinear surface by which a belt is disengaged from a pulley.

BACKGROUND OF THE INVENTION

Belt drive systems comprise a significant and widely used form of mechanical power transmission. Generally a belt runs between two or more pulleys or idlers, more particularly a driver and driven pulley and/or an idler or idlers.

In order to efficiently transmit power between the driver and driven pulleys the belt is installed with a predetermined preload or tension. The amount of tension is generally a function of the horsepower and torque requirements of the drive. Increased horsepower or torque requirements will generally require a commensurate increase in the belt tension.

In order to achieve the proper belt tension, one or more of the pulleys is loosened so the shaft or shafts can be moved to allow a slack condition in the belt. Then, the belt is looped over the pulleys. The loosened pulley or pulleys are then pulled or tightened into a predetermined position, resulting in a tension being created in the belt. This process requires the pulley(s) to be mechanically adjusted in order to properly preload the belt.

Belts may be de-installed from pulley systems using the same methods. For systems with an automatic tensioning device or tensioner, the tensioner spring is put into a locked position, and the belt is removed from the tensioner.

For belt systems without a tensioner, the belt is removed from the pulley(s) by loosening a bracket, bolt or similar device.

Another method of de-installing a belt involves use of a tool that extracts the belt from a pulley groove without mechanically adjusting the pulleys. The tool is used adjacent to a pulley. As the pulley is turned the tool stretches the belt while laterally forcing it out of a pulley groove.

Representative of the art is U.S. Pat. No. 4,193,310 (1980) to Boyer et al., which discloses a pulley having a diverging means extending radially and laterally from the rim for engaging and seating the belt on the pulley rim. This invention does not comprise a bearing surface for gradually removing a belt from a pulley.

The prior art device forces a belt to bend over small radius portions of the tool, causing high stress concentrations that damage the belt during de-installation. Further, as the belt is forced out of the groove, high lateral loads damage the sidewalls of the belt. Finally, the transverse motion of the belt as it moves out of the pulley groove may damage the belt ribs.

What is needed is a belt de-installation tool having a monolithic body. What is needed is a belt de-installation tool having a curvilinear body. What is needed is a belt de-installation tool having an extended belt engaging surface. What is needed is a belt de-installation tool having a pulley groove engaging surface. What is needed is a belt de-installation tool having a lip for engaging a pulley groove. What is needed is a belt de-installation tool that is disengageable from a pulley. The present invention meets these needs.

SUMMARY OF THE INVENTION

The primary aspect of the invention is to provide a belt de-installation tool having a curvilinear body.

Another aspect of the invention is to provide a belt de-installation tool having a monolithic body.

Another aspect of the invention is to provide a belt de-installation tool having an extended belt engaging surface.

Another aspect of the invention is to provide a belt de-installation tool having a pulley groove engaging surface.

Another aspect of the invention is to provide a belt de-installation tool having a lip for engaging a pulley groove.

Another aspect of the invention is to provide a belt de-installation tool that is disengageable from a pulley.

Other aspects of the invention will be pointed out or made obvious by the following description of the invention and the accompanying drawings.

The invention comprises a belt de-installation tool having a monolithic curvilinear body. The body comprises a pulley engaging surface for engaging a perimeter of a pulley. A sloped arcuate belt engaging surface extends from the pulley engaging surface at a predetermined angle. A curved surface also extends from each end of the tool at a predetermined angle to the belt engaging surface. The tool is placed on a pulley between belt spans. As the pulley is turned the belt rides up on a curved surface of the tool, holding the tool in contact with the pulley. As it rotates, the belt comes into engagement with and gradually tracks across the sloped arcuate belt engaging surface, moving laterally to a pulley plane until it is fully disengaged from the pulley groove by action of the sloped arcuate belt engaging surface.

BRIEF DESCRIPTION OF THE DRAWINGS

The accompanying drawings, which are incorporated in and form a part of the specification, illustrate preferred embodiments of the present invention, and together with a description, serve to explain the principles of the invention.

DETAILED DESCRIPTION OF THE PREFERRED EMBODIMENT

Figure 1:
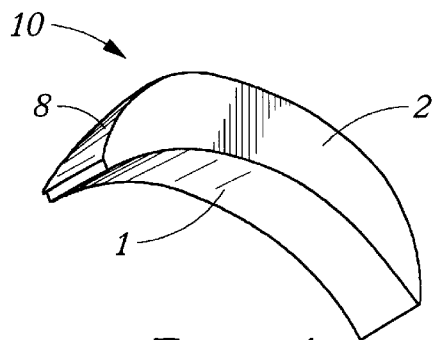
FIG. 1 is a back perspective view of the tool.

FIG. 1 is a back perspective view of the tool. Tool 10 comprises a monolithic curvilinear body having an arcuate pulley engaging surface 1. In use, the tool is temporarily installed on a pulley groove perimeter between spans of a belt trained about the pulley. The belt engages a tool surface as the pulley is slowly turned, thereby disengaging a belt. The tool may be used on v-belt pulleys (single groove) as well as on multi-ribbed pulleys (more than one groove). Surface 1 engages a perimeter of a pulley (not shown).

Figure 2:
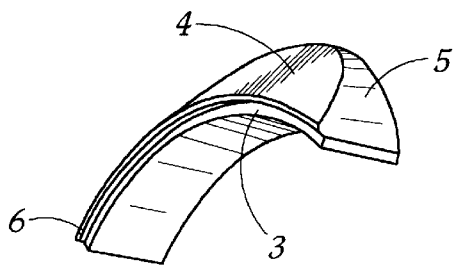
FIG. 2 is a perspective view of the tool.

FIG. 2 is a perspective view of the tool. Curvilinear belt engaging surface 4 describes a side of the tool. Surface 4 is the surface that a belt progressively bears upon as the pulley is turned and as the belt is removed from a pulley. Surface 5 is an arcuate surface that provides a gradual transition path for the belt to be initially disengaged from a pulley groove. Groove 6 engages an outer edge of a pulley and surface 3 holds the tool in proper alignment with the pulley while it is in use.

Figure 3:
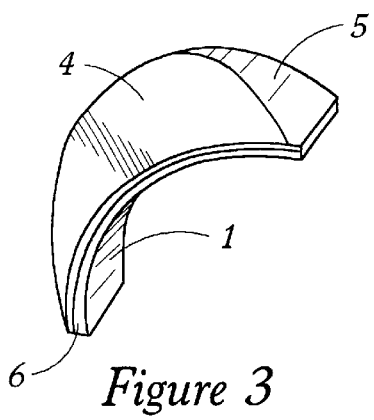
FIG. 3 is a front perspective view of the tool.

FIG. 3 is a front perspective view of the tool.

Figure 4:
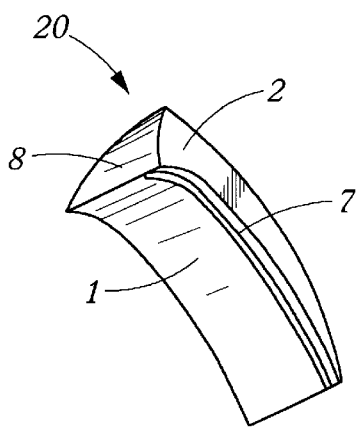
FIG. 4 is a back perspective view of an alternate embodiment.

FIG. 4 is a back perspective view of an alternate embodiment. Tool 20 substantially comprises the same components as tool 10 with the exception that a lip 7 is present on pulley engaging surface 1. Groove 6 is not present in this embodiment, although it is possible to combine the groove and lip as circumstances may require. Lip 7 extends normally to surface 1. Lip 7 allows the tool to engage a groove on a pulley, thereby holding it in proper position as the tool is used. Any form of mechanical protrusion projecting from the pulley engaging surface may be used to substantially hold the tool on a pulley perimeter.

Figure 5:
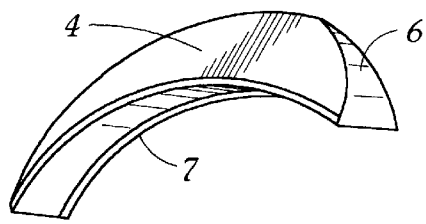
FIG. 5 is a perspective view of an alternate embodiment.

FIG. 5 is a perspective view of an alternate embodiment. Although lip 7 is depicted to one side of surface 1, lip 7 may be located at any position on surface 1, so long as it is engageable with a pulley groove.

Figure 6:
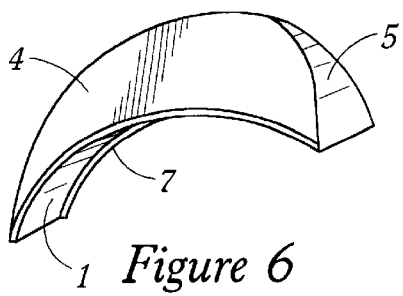
FIG. 6 is a front perspective view of an alternate embodiment.

FIG. 6 is a front perspective view of an alternate embodiment.

Figure 7:
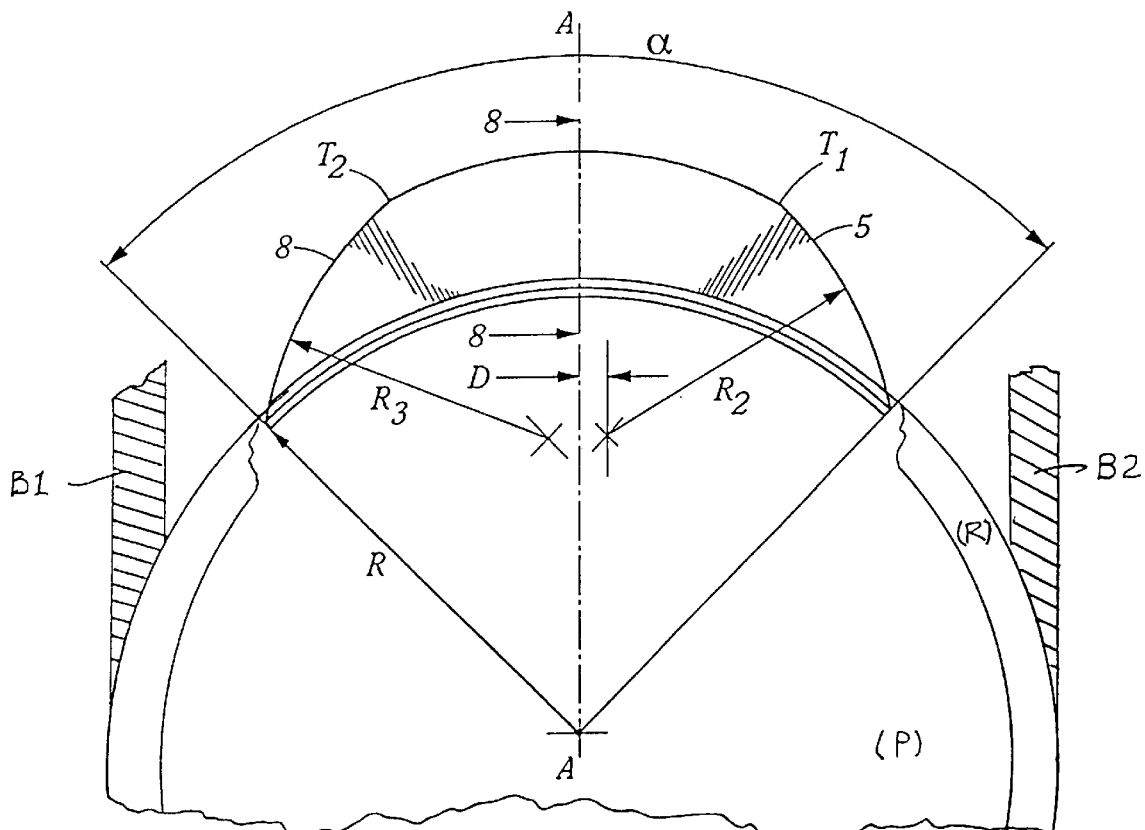
FIG. 7 is a front elevation view of the tool depicted in FIG. 4.

FIG. 7 is a front elevation view of the tool depicted in FIG. 4. The included angle α from end to end of the preferred embodiment is approximately 90°. Angle α may be in the range of 20° to 180°. This allows the tool to be of sufficient size to be placed on a pulley P between the two belt spans B1, B2. The tool has a curve of radius R. Radius R is substantially equal to the radius of a pulley upon which the tool is used, although the tool will function with a slight mismatch between the pulley and tool radii. Each side surface 5 and 8 has a radius $R_2$ and $R_3$. Surfaces 5 and 8 can also comprise a free-formed surface, so there is no edge on the tool. The center of curvature of $R_2$ and $R_3$ are each located a distance D to one side respectively of a central axis A—A. The center of curvature for each arcuate side surface 5 and 8 being on the same side of the body as the center of curvature of the pulley engaging surface. In the preferred embodiment $R_2$ and $R_3$ are substantially equal, and both are less than R. Radii $R_2$ and $R_3$ and distance D may be of a magnitude to allow a tangent point of the curve of each surface 5 and 8, $T_1$ and $T_2$ respectively, to coincide on axis A—A. This arrangement results in the minimum angular a size for the tool. This allows the tool to have minimum cost as well as allowing it to properly fit between spans of a belt, B1, B2 having a large angular wrap (>180°) about a pulley P. Pulley P, shown in partial section comprises rim R, shown in partial section.

Figure 8:
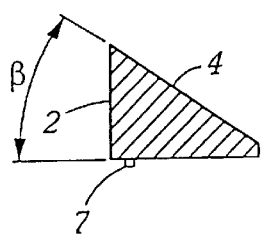
FIG. 8 is a side elevation view of the tool at section 8—8, FIG. 7.

FIG. 8 is a side elevation view of the tool at section 8—8, FIG. 7. The included angle β between surface 1 and surface 4 is 35° in the preferred embodiment. The range for β can be 20° to 45°. Although lip 7 is shown extending normally along an entire width of pulley engaging surface 1, lip 7 may have any length sufficient to substantially hold it in place on a pulley during use. Surface 4 may be planar when viewed in section as in FIG. 8 or may describe a convex shape to facilitate disengagement of a belt from a pulley groove.

In use, tool 10 is placed on an outer perimeter of a pulley between the spans of a belt engaged with a pulley. To disengage a belt, the pulley is rotated. As the pulley is rotated surface 5, (or surface 8, each being either end of the tool) first engages the belt. As the pulley turns further the belt continues to bear upon surface 5 and then progressively upon belt engaging surface 4. Engagement with the belt also serves to hold the tool in place on the pulley during use. Since surface 4 is sloped or inclined at an angle to an operational plane of the belt, the belt rides progressively laterally to the pulley across surface 4 as the pulley turns. This disengages the belt from a pulley groove. As the rotation of the pulley approaches a complete rotation, the belt is fully disengaged from the pulley having been moved out of the groove to one side of the pulley. The tool may then be removed from the pulley. The tool will disengage multi-ribbed belts from pulleys as well as v-belts.

Although a single form of the invention has been described herein, it will be obvious to those skilled in the art that variations may be made in the construction and relation of parts without departing from the spirit and scope of the invention described herein.

I claim:

1. A belt de-installation tool comprising:
   a curvilinear body having an pulley engaging surface and a belt engaging surface;
   the pulley engaging surface and the belt engaging surface describing an included angle;
   a groove for engaging a pulley rim extending along a portion of an edge where the pulley engaging surface and the belt engaging surface meet;
   a lip projecting substantially normally to the pulley engaging surface; and
   the lip oriented to allow it to engage a pulley groove whereby the tool is prevented from moving substantially laterally to a pulley.

2. The tool as in claim 1, wherein the belt engaging surface is substantially planar in section.

3. The tool as in claim 1, wherein:
   the pulley engaging surface having an arcuate shape.

4. The tool as in claim 3 further comprising:
   an arcuate surface at each end of the body and each adjoining the belt engaging surface, the center of curvature for each arcuate surface being on the same side of the body as the center of curvature of the pulley engaging surface.

5. The tool as in claim 4 wherein the included angle is in the range of 20° to 45°.

6. The tool as in claim 4 wherein the angle is in the range of 20° to 180°.

7. The tool as in claim 4 wherein:
   a length of the body is contained within an angle between two spans of a belt and engaged with a pulley without contacting either belt span, the center of curvature of the body arc substantially coincides with a center of curvature of the pulley engaging surface.

8. The tool as in claim 7 wherein the body is monolithic.

* * * * *